Jan. 2, 1962     D. L. SUPERNAW     3,015,297
ENABLING DEVICE FOR ACOUSTIC TORPEDO HOMING SYSTEMS
Filed June 10, 1959     2 Sheets-Sheet 2

INVENTOR.
DWIGHT L. SUPERNAW
BY
*J.C. Muller*
ATTORNEYS.

United States Patent Office 3,015,297
Patented Jan. 2, 1962

3,015,297
ENABLING DEVICE FOR ACOUSTIC TORPEDO HOMING SYSTEMS
Dwight L. Supernaw, Key West, Fla., assignor, by mesne assignments, to the United States of America as represented by the Secretary of the Navy
Filed June 10, 1959, Ser. No. 819,518
3 Claims. (Cl. 114—23)

This invention relates to acoustic homing systems for torpedoes and more particularly to improvements in acoustic level operated enabling devices within such systems.

In systems of the type referred to there are two well known acoustic homing operating conditions, the disenabled condition wherein the homing system listens to pick up a target signal and the torpedo steering commands are provided by some sort of a programming device which steers the torpedo along an appropriate search trajectory, and the enabled condition wherein after a target is picked up the acoustic system provides the torpedo steering commands causing the torpedo to home toward a target. An acoustic level operated enabling device is employed to enable the acoustic system if a target signal of adequate strength is picked up. It is apparent that the minimum target signal level which will operate the enabler, sometimes referred to as the enabling threshold, is the measure of sensitivity of the acoustic system. The maximum possible sensitivity is determined by torpedo self noises including torpedo propulsion noises and cavitation noises, it being necessary that the enabling threshold exceed the self noise level by a certain amount in order to provide an adequate steering command. The level of self noise generated by a torpedo varies with torpedo running depth, the self noise level being maximum at the surface and decreasing as depth increases until at some critical depth beneath the surface, at approximately 60 feet, the noise level reaches a minimum value and remains substantially fixed at such minimum level for all depths therebelow. Because of this characteristic of self noise, acoustic torpedoes are not permitted to rise above the critical depth in the disenabled condition and the enabling threshold is set close to the minimum self noise level, thereby maximizing sensitivity. If the target is above the critical depth, as for example where the target is a surface ship, the torpedo will after enabling rise above the critical depth as a part of normal homing on the target, but it should be understood that in acoustic systems heretofore available the enabling threshold remains fixed at the value determined by optimizing sensitivity for running depths at or below the critical depth.

The enabling device also operates to disenable the acoustic homing system if the target signal is lost, permitting the programming device to steer the torpedo along a reattack trajectory whereby it is likely to again pick up the target signal. However, the prior art devices are in many instances unable to do this if the target is lost while the torpedo is running at a depth above the critical depth because the self noise level at such depth exceeds the enabling threshold and holds the torpedo in the enabled condition. Accordingly, acoustic homing systems heretofore available have not been able to discriminate between self noises and target signals while the torpedo runs at depths above the critical depth so that if a target signal were lost the torpedo continues to steer along some erratic course until its propulsive power supply is exhausted.

It is an object of the present invention to provide an acoustic level operated acoustic enabling device of the type referred to which is capable of discriminating between target signals and torpedo self noises at running depths above the critical depth.

It is another object to provide an acoustic homing system which returns to the disenabled condition if a target signal is lost at running depths above the critical depth.

Other objects and many of the attendant advantages of this invention will be readily appreciated as the same becomes better understood by reference to the following detailed description when considered in connection with the accompanying drawings wherein.

Figure 1:
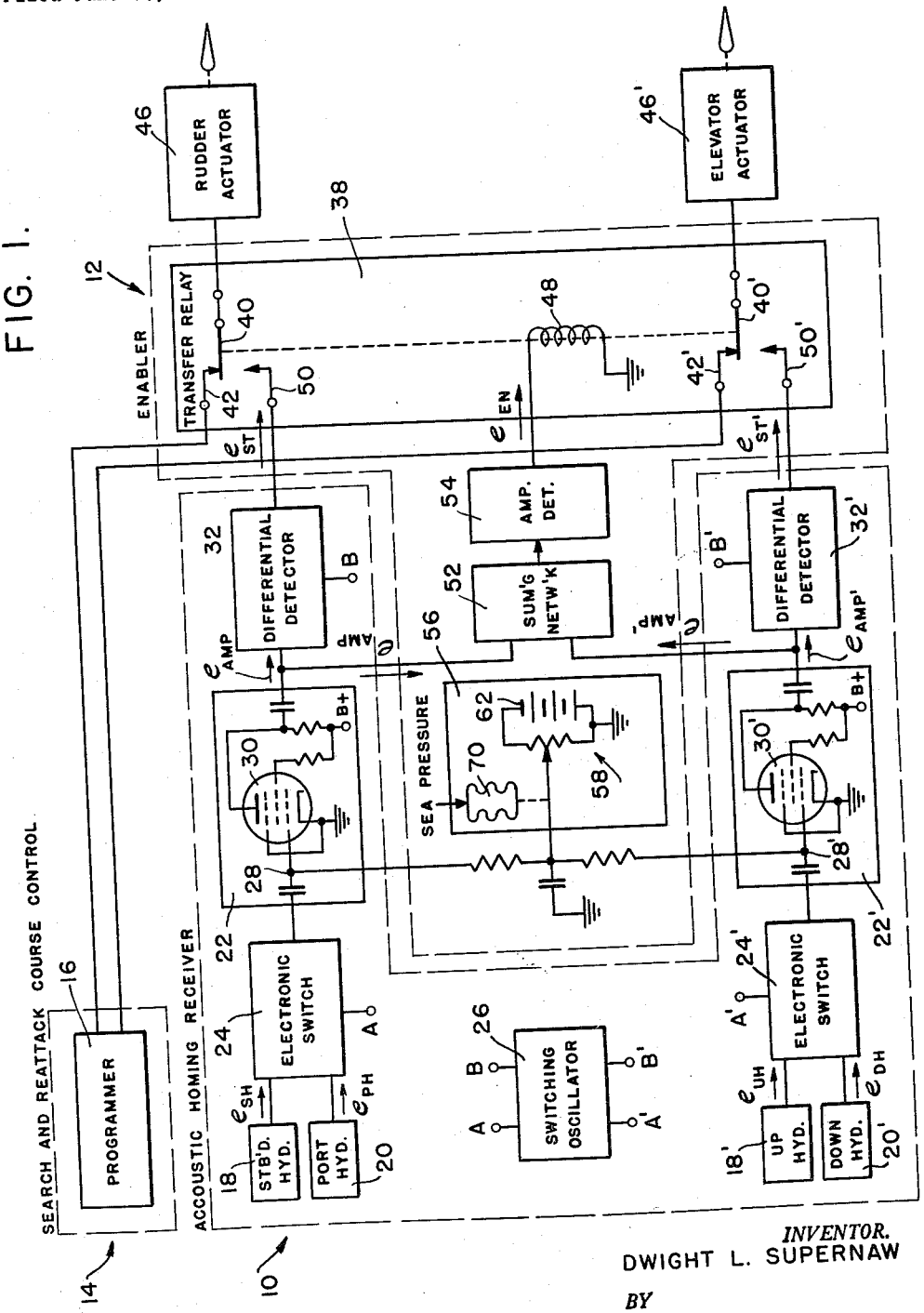
FIG. 1 is a block diagram of an acoustic homing system of the type referred to which embodies the present invention.

Referring to the drawing and in particular to FIG. 1, a passive type acoustic homing system embodying the present invention comprises generally an acoustic homing system receiver 10, an acoustic level operated enabler 12, and a search and reattack course control 14. Noises which are generated by the target, as for example by the propulsion machinery of the ship or submarine constituting the target, are emitted from the target and propagated through the water, constituting a target signal which is picked up by receiver 10, which in turn interprets the target position from such target signal providing a steering command which when fed to the torpedo steering mechanism causing the torpedo to home on the target. Enabler 12 determines whether the acoustic sound level being received by the receiver unit is of sufficient magnitude to indicate the presence of a target signal adequate to provide such steering command, and if the sound level is of such magnitude it enables the acoustic system by feeding the steering command to the steering mechanisms, and if thereafter the sound level drops below such magnitude, it ceases to feed a steering command to the steering mechanism. During the periods when the acoustic system is disenabled the torpedo receives its steering commands from the search and reattack course control 14, which includes a programmer 16 that is preset to cause the torpedo to follow an initial attack trajectory before enabling, and to provide an appropriate reattack trajectory if after the acoustic system is enabled, the target is lost. The operation of the system with respect to horizontal steering and depth steering are basically identical, so that in some instances only the horizontal steering will be discussed, it being understood that the corresponding elements relating to depth steering bear primed reference numerals.

Within receiver 10, and in particular within the horizontal steering channel thereof, underwater sounds are received by a starboard hydrophone 18 and a port hydrophone 20 mounted in the torpedo nose in a normally horizontal plane, such hydrophones being directionally mounted so that in combination the starboard hydrophone A.C. electrical output signal $e_{SH}$ and the port hydrophone A.C. electrical output signal $e_{PH}$ contain information as to the target position within a horizontal plane, as is well known in the art. The corresponding signals for up hydrophone 18' and down hydrophone 20' are designated $e_{UH}$ and $e_{DH}$, respectively. In order to insure equal amplification the starboard and port hydrophone output signals $e_{SH}$, $e_{PH}$ are alternately fed into a single A.C. amplifier 22 by means of an electronic switch 24 regulated by a switching oscillator 26 and communicating therewith through terminal A. A.C. amplifier 22 is of the variable gain type, for reasons which will be hereinafter explained, the gain of such amplifier varying inversely with the magnitude of negative bias voltage applied to the control grid terminal 28 and tube 30, which is a variable-mu pentode type tube, such type of variable gain amplifier being well known in the art. The resultant A.C. amplifier output signal $e_{AMP}$ consists of sequential components representing the starboard and port hydrophone output signals $e_{SH}$ and $e_{PH}$, amplified and alternated at a frequency of alternation determined by switching oscillator 26, and is fed to an amplitude differential detector 32 also regulated by switching oscillator 26 and communicating therewith through terminal B, which detector compares the two components providing the horizontal acoustic steering command signal $e_{ST}$ which is a D.C. electrical signal having a polarity determined by which of the two hydrophone signals is highest and having a magnitude determined by the difference in levels of such signals. It is to be understood that the aforesaid receiver unit is selected from among relatively well known circuits and is somewhat simplified for purposes of simplicity of disclosure, the principle of the present invention being equally applicable to acoustic homing systems employing other types of receivers, including the type of receiver disclosed in the application of Harvey Brooks et al., Serial No. 305,432, filed August 20, 1952.

Figures 3, 4:
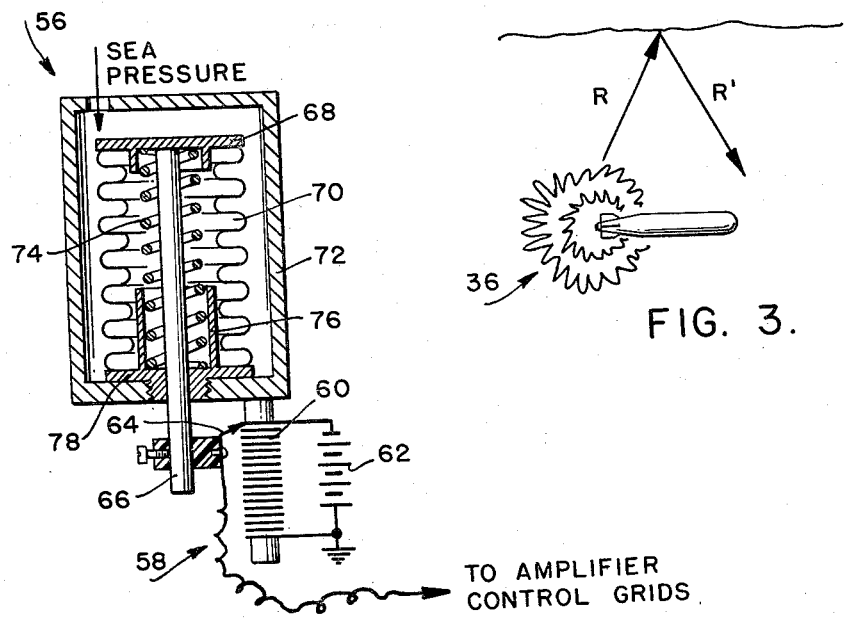
FIG. 3 is a diagram illustrating torpedo self noise phenomena at shallow running depths.
FIG. 4 shows the depth responsive bias control employed in the acoustic homing system of FIG. 1.

It is to be assumed that the electronic circuitry of receiver 10 has an inherent sensitivity of at least −125 dbv (decibels relative to one volt) signal level at the outputs of the hydrophones 18, 20, 18′, 20′ and that the sensitivities of the hydrophones are substantially equal. The self noise characteristic of a torpedo representative of the present state of the art in terms of average level of outputs of the hydrophones is shown by solid line curve 34 in FIG. 2, it being understood that while the curve terminates at 70 feet running depth, the self noise remains substantially constant at all depths therebelow. It can be seen that the minimum self noise level is −125 dbv, such level being substantially constant at running depths of 60 feet and below, while in the range of depths extending from 60 feet upward to the surface the self noise level increases as depth decreases. According to theory such increase is caused by a combination of cavitation noises which are generated at shallow depths and the effect of sound reflections from the surface of the water, diagrammatically illustrated by arrows R and R′ in FIG. 3, which reflections cause torpedo propulsion and cavitation noises 36, radiated from the stern of a torpedo to be reflected to the nose portion of the torpedo where the hydrophones are mounted. As is well known in connection with underwater sound reception apparatus, there is a minimum signal to noise ratio characteristic of receiver 10, and the observation of a target signal is unsatisfactory unless the target signal level is sufficient to attain this ratio. It is to be assumed that the critical signal to noise ratio for receiver 10 is approximately 2:1, which expressed in terms of decibels relative to voltages is equivalent to a condition wherein the target signal exceeds the self noise level by 6 db. Accordingly, although the inherent sensitivity of the receiver exceeds −125 dbv, the sensitivity of such receiver in a torpedo having the self noise characteristics of curve 34 is actually limited by self noise since the target signal must be 6 db higher than the self noise in order to be useable. For example, below running depths of 60 feet the target signal must exceed −119 db average signal level at the outputs of the hydrophones in order to provide an adequate steering command, and at any depth in the range of depths between the surface and 60 feet the minimum useable signal must be at least 6 db above curve 34. It is to be understood that the same principles apply in connection with active acoustic homing signals where the target signal consists of sound echoes reflected by the target, except that in such systems the reverberation noise level may exceed the self noise level during the early portion of the listening interval so that the receiving units of such systems are generally limited by self noise for only a portion of each listening interval.

Figure 2:
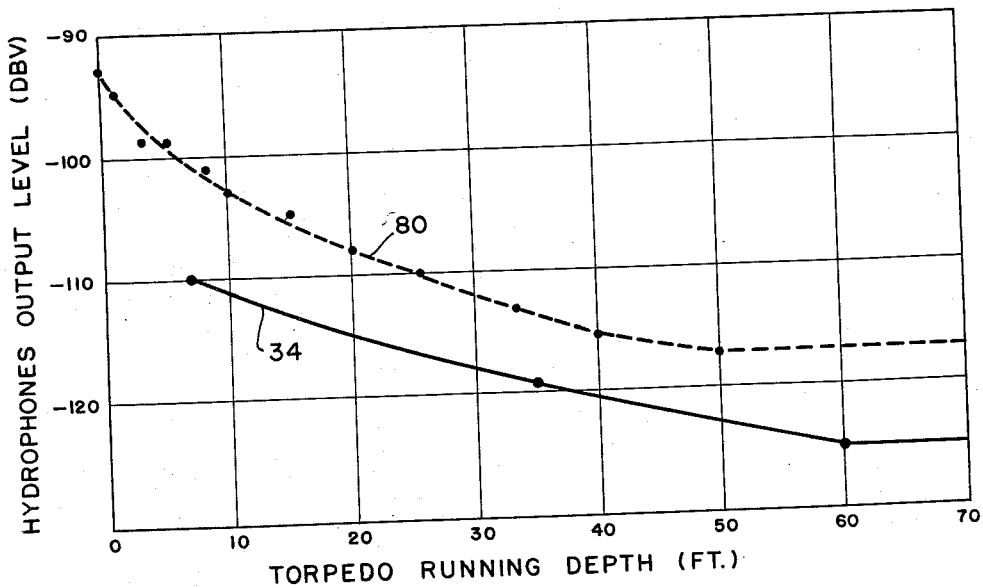
FIG. 2 shows a curve of self noise vs. torpedo running depth and a curve of the enabling threshold vs. torpedo running depth of an acoustic homing system employing the present invention.

Within enabler 12, the enabling and disenabling of the acoustic system is effected by a transfer relay 38 having a pair of movable contacts 40, 40′ which normally engage fixed contacts 42, 42′ feeding steering commands from the programmer 16 to rudder and elevator actuators 46, 46′, the relay operating to move contacts 40, 40′ into engagement with fixed contacts 50, 50′ when the current flowing through relay coil 48 exceeds a predetermined trip level, in which position the acoustic steering command signals $e_{ST}$, $e_{ST'}$ are fed to the rudder actuator enabling the acoustic homing system, and if after enabled, the current flowing through coil 48 drops below the trip level the movable contacts return to the normal position, it being understood that such function could be effected as well by an equivalent electronic gate circuit. Relay coil 48 is energized by a D.C. enabler signal $e_{EN}$ having an amplitude proportional to the average level of the outputs of hydrophones 18, 20, 18′, 20′ as amplified by a gain factor determined by A.C. amplifier 22, such signal being obtained by independently coupling a portion of the A.C. amplifier output signals $e_{AMP}$, $e_{AMP'}$ to a summing network 52 where the two signals are added and then fed to an amplitude detector 54 which provides enabler signal $e_{EN}$ which is fed to relay coil 48. It is apparent that there is a direct relationship between the trip level of relay coil 48, the gain of A.C. amplifier 22, and the enabling threshold at the hydrophone outputs. For example, if it is desired that the acoustic system be enabled if an acoustic signal producing a −117 dbv average level at the outputs of hydrophones 18, 20, 18′, 20′ is received, A.C. amplifiers 22, 22′ should have gains whereby an acoustic signal having such −117 dbv level produces an enabler signal $e_{EN}$ having a magnitude equal to the trip level of relay coil 48. It is also apparent that the enabling level at the hydrophone outputs varies inversely with the gain of the amplifiers. For example, if it is desired to increase the enabling threshold by 6 db, from −117 dbv to −111 dbv, which as expressed in terms of voltages is equivalent to doubling the enabling threshold, the gain of A.C. amplifier 22 should be halved. In the present invention the enabling threshold is regulated to be 6 db or more above the self noise level by designing A.C. amplifiers 22, 22′ to provide the desired range of enabling thresholds and by controlling their gains by a depth responsive bias control assembly 56. Bias control assembly 56 shown more particularly in FIG. 4 consists of a potentiometer 58 with its resistor member 60 connected across a bias battery 62, the positive pole of the battery being grounded as shown so that the magnitude of negative voltage appearing along the resistor element is highest at the end connected to the negative pole of the battery dropping to ground potential at the other end. A sliding contact 64 slides along resistor member 60, feeding a negative voltage to the control grids of A.C. amplifiers 22, 22′ (FIG. 1), the sliding contact being moved along the length of the resistor element by an operating shaft 66 attached to the movable wall portion 68 of a conventional depth sensing bellows 70 mounted in a hydrostatic cell 72 communicating with sea pressure, it being understood that the same effect could be obtained if resistor member 60 and sliding arm contact 64 were employed as a variable resistance voltage dropping resistor in series with a voltage supply. A compression spring 74 within bellows 70 has a spring constant allowing wall portion 68 to move from its fully expanded position, the position shown in FIG. 4, to a partially collapsed position wherein wall portion 68 engages an abutment 76 extending from a fixed wall portion 78 of the bellows, as the torpedo running depth varies over a depth range extending from the surface downward to a depth of 60 feet, so that sliding contact 64 moves from a position wherein it picks off a higher bias voltage to a position wherein it picks off a lower bias voltage as the torpedo depth increases over such range, thereby causing the enabling threshold to vary inversely with depth over such range, abutment 76 serving to limit movement of the slide arm for torpedo depths below 60 feet so that the enabling threshold will remain fixed at its minimum value for all running depths below 60 feet. Broken line curve 80, FIG. 2, is a curve of the enabling threshold vs. running depth obtainable by employing the aforesaid depth responsive bias control assembly in an acoustic homing system which employs the present invention. As seen from curve 80, at all operating depths the enabling threshold is approximately 6 db above the self noise level thereby allowing the acoustic system to operate at optimum sensitivity for the depth at which the torpedo is running in contradistinction to prior art devices in which the enabling threshold is fixed. Also, in contradistinction to prior art devices the acoustic level enabler operates to disenable the acoustic homing system if the target signal is lost while the torpedo is running at depths within the shallow high self noise range of depths. For example, as shown by curve 34, at a depth of 20 feet, the torpedo self noises result in a −114 dbv average signal level at the outputs of hydrophones 18, 20, 18', 20' so that as heretofore explained the target signal must be approximately 6 db higher, or −108 dbv in order that receiver unit 10 provides an adequate steering command. As shown by curve 80, the enabling threshold at 20 feet depth is approximately 108 dbv, so that if the target signal drops below −108 dbv the acoustic homing system will disenable permitting the programmer 16 to steer the torpedo along an appropriate reattack trajectory.

While the enabler to a certain extent interacts with the receiver, there are no adverse resultant effects since it has been found that in most tactical situations involving a shallow target the torpedo will close with its target at a rate whereby the strength of the target signal will increase sufficiently fast to more than compensate for the decrease in enabling threshold caused by the bias control assembly 56 as the torpedo rises in the attack so that the target is not thusly lost. Nor does decreasing the gain of A.C. amplifier 22 interfere with providing an adequate steering command, since signals $e_{ST}$, $e_{ST'}$ are basically determined by comparing individual hydrophone signal levels. However, if for any reason it is deemed desirable to isolate the operation of the enabler 12 from the operation of the receiver 10, it is to be understood that the principle of the present invention is equally applicable to a system having a separate receiver for the enabler.

In the case of active acoustic homing systems, where the system is not self noise limited at all times, it is to be understood that the present invention is employed in a manner whereby it is effective for only that portion of the listening interval wherein the system is self noise limited.

Obviously many modifications and variations of the present invention are possible in the light of the above teachings. It is therefore to be understood that within the scope of the appended claims the invention may be practiced otherwise than as specifically described.

What is claimed is:

1. In a torpedo having an acoustic homing apparatus and having an acoustic level operated device for enabling the acoustic homing apparatus wherein sound sensing means transforms sonic energy to an electrical signal, an amplifier transforms said electrical signal to an amplified signal and relay means receives said amplified signal, the relay means being adapted to enable the acoustic homing system upon receipt of an amplified signal of a predetermined level to permit steering of the torpedo, the improvements, in combination, comprising: adjustable means to vary the gain of said amplifier, and pressure responsive means adapted to sense depth of submergence of the torpedo within a range of depths wherein the level of torpedo self noise received by said sound sensing means is above minimum, said pressure responsive means being operatively connected to said adjustable means to vary the gain of said amplifier as a function of depth of submergence of the torpedo whereby the acoustic homing system will not be enabled by self noise.

2. The apparatus of claim 1 wherein the said relay means is further adapted to disenable the acoustic homing apparatus in response to a drop of said amplified signal below a predetermined level.

3. The apparatus of claim 1 wherein said pressure responsive means includes a movable wall subject to water pressure and said means to vary the gain comprises a potentiometer actuated by said movable wall.

References Cited in the file of this patent

UNITED STATES PATENTS 2,566,858    Sebring _____ Sept. 4, 1951